United States Patent
Stockhausen et al.

(10) Patent No.: US 8,181,636 B2
(45) Date of Patent: May 22, 2012

(54) BI-FUEL ENGINE USING HYDROGEN

(75) Inventors: William Francis Stockhausen, Northville, MI (US); Diana D. Brehob, Dearborn, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 50 days.

(21) Appl. No.: 12/491,827

(22) Filed: Jun. 25, 2009

(65) Prior Publication Data

US 2009/0260606 A1    Oct. 22, 2009

Related U.S. Application Data

(62) Division of application No. 11/855,439, filed on Sep. 14, 2007, now abandoned.

(51) Int. Cl.
*F02B 7/00* (2006.01)
*F02B 13/00* (2006.01)

(52) U.S. Cl. .................... 123/577; 123/575

(58) Field of Classification Search ............ 123/575, 123/1 A, 576, 577
See application file for complete search history.

(56) References Cited

U.S. PATENT DOCUMENTS

| | | | |
|---|---|---|---|
| 4,787,349 A | 11/1988 | Hilger | |
| 5,660,602 A * | 8/1997 | Collier et al. | 48/127.3 |
| 5,666,923 A * | 9/1997 | Collier et al. | 123/488 |
| 5,787,864 A * | 8/1998 | Collier et al. | 123/492 |
| 5,921,076 A | 7/1999 | Krutzsch | |
| 6,122,909 A | 9/2000 | Murphy | |
| 6,543,423 B2 | 4/2003 | Dobryden | |
| 6,668,804 B2 * | 12/2003 | Dobryden et al. | 123/480 |
| 6,845,608 B2 | 1/2005 | Klenk | |
| 7,293,409 B2 | 11/2007 | Sellnau et al. | |
| 7,412,947 B2 | 8/2008 | Shinagawa et al. | |
| 2002/0185086 A1 * | 12/2002 | Newman et al. | 123/1 A |
| 2004/0065274 A1 * | 4/2004 | Cohn et al. | 123/1 A |
| 2005/0188683 A1 | 9/2005 | Miyoshi et al. | |
| 2005/0224042 A1 * | 10/2005 | Shinagawa et al. | 123/295 |
| 2005/0229872 A1 | 10/2005 | Lange | |
| 2006/0101823 A1 | 5/2006 | Takemoto | |
| 2006/0283423 A1 | 12/2006 | Ito | |
| 2007/0039588 A1 | 2/2007 | Kobayashi | |
| 2008/0308056 A1 | 12/2008 | Schlitz et al. | |

\* cited by examiner

*Primary Examiner* — Stephen K Cronin
*Assistant Examiner* — Sizo Vilakazi
(74) *Attorney, Agent, or Firm* — Julia Voutyras; Brooks Kushman P.C.

(57) ABSTRACT

A method is disclosed for making a transition from fueling an engine with hydrogen to another fuel. That other fuel may be gasoline, a gasoline and alcohol mixture, or gaseous fuels, as examples. The other fuel has the capability of providing higher BMEP than the hydrogen because of better air utilization and because the other fuel occupies less volume of the combustion chamber. Because a desirable equivalence ratio to burn hydrogen is at 0.5 or less and a desirable equivalence ratio to burn other fuel is at 1.0, when a demand for BMEP that leads to a transition change from hydrogen fuel to the other fuel, the amount of air supplied to the engine is decreased to provide more torque and vice versa. During a transition in which liquid fuel supply is initiated, it may be desirable to continue to provide some hydrogen, not leaner than 0.1 hydrogen equivalence ratio.

21 Claims, 4 Drawing Sheets

BI-FUEL ENGINE USING HYDROGEN

CROSS REFERENCE TO RELATED APPLICATION

This application is a division of U.S. patent application Ser. No. 11/855,439 filed Sep. 14, 2007, now abandoned.

BACKGROUND

Field of the Invention

A method to operate an internal combustion engine which is supplied with both hydrogen fuel and another fuel is disclosed.

Because of concerns about greenhouse gases that are emitted from carbon-containing fuels, such as gasoline, diesel, and alcohol fuels, there is keen interest in fueling motor vehicles with hydrogen, which produces water upon combustion. Hydrogen-fueled internal-combustion engines suffer from a low power output compared to gasoline or diesel powered engines due to hydrogen being a gaseous fuel which takes up much of the volume in the cylinder, particularly when compared to dense fuels like gasoline or diesel fuel. Furthermore, hydrogen combustion is limited to operating at an equivalence ratio of about 0.5 or less due to increasing combustion harshness and, if it is a concern, rapidly increasing NOx emission. An equivalence ratio of one is a stoichiometric ratio meaning that the proportion of fuel to air is such that all the oxygen and fuel could burn completely. An equivalence ratio of 0.5 is a lean ratio in which the amount of air supplied is double that needed to completely consume the fuel. Such a limit in equivalence ratio results in about half the fuel delivery as could be consumed by the amount of air in the chamber, and consequently about half of the torque developed by the engine than if at a stoichiometric proportion.

Equivalence ratio is defined as the mixture's fuel to air ratio (by mass) divided by the fuel to air ratio for a stoichiometric mixture. A stoichiometric mixture has an equivalence ratio of 1.0; lean mixtures are less than 1.0; and, rich mixtures are greater than 1.0.

SUMMARY

The inventors of the present invention have recognized that by operating on two fuels: hydrogen and gasoline, as an example, the engine could be operated on hydrogen at low torque levels and on gasoline at higher torque levels. Hydrogen combusts readily at very lean equivalence ratios and is well suited to burning robustly at very low torques with at most, a minimum of throttling. Gasoline is well suited to providing high torque because of its high energy density and ability to operate at stoichiometric. The inventors of the present invention propose a bifuel engine in which transitions are made between operating on hydrogen and another fuel.

The high torque fuel can be a hydrocarbon, such as natural gas, propane, gasoline, or alcohols, such as methanol or ethanol. Furthermore, combinations of the gaseous fuel or combinations of the liquid fuels may also be used, such as E85, a mixture of 85% ethanol with 15% gasoline. High torque fuels contain carbon, which upon combustion reacts to form carbon dioxide, a greenhouse gas. Because hydrogen produces only water as the product of combustion, it does not form a greenhouse gas. Thus, it is desirable to operate on hydrogen when possible and using the carbon containing fuels as needed to provide the desired torque.

A normalized engine torque commonly used by one skilled in the art is BMEP, brake mean effective pressure, which for 4-stroke engines is $2*P/(V*N)$, where P is brake power, V is displaced volume, and N is engine rpm. A method for making a transition from a first to a second operating mode is disclosed in which the air supply is decreased, supply of a first fuel is decreased, and supply of a second fuel is initiated at the start of the transition. The first fuel is substantially 100% hydrogen and the second fuel is primarily comprised of hydrocarbons, gasoline or gasoline and alcohol mixtures, as examples. Alternatively, the second fuel is a gaseous hydrocarbon. During the transition, the amount of hydrogen is continuously decreased so that at termination of the transition, hydrogen is no longer being supplied to the engine. Concurrently, the amount of the second fuel is increased during the transition in coordination with the decrease of hydrogen. The transition is initiated when a demand for torque causes the equivalence ratio of hydrogen fuel to exceed a threshold, which threshold is approximately 0.5. The air supply decrease is accomplished by closing the engine's throttle valve with the air supply decrease being in the range of 30-60% during the transition. In one embodiment, the transition is further initiated in response to the engine piston speed exceeding a threshold. Engine piston speed is computed as $2*S*N$, where S is stroke and N is engine rpm. The piston speed is not constant through the revolution; the piston speed computed here is average piston speed.

Also disclosed is a method to transition between two operating modes in an internal combustion engine in which air supply is increased substantially, supply of hydrogen is initiated and supply of a second fuel is decreased, all occurring roughly at the initiation of the transition. The transition is initiated in response to a demand for a torque decrease below a threshold BMEP: that BMEP being 3.5 to 5 bar for a naturally aspirated engine and between 6 and 8 bar for a pressure charged engine. During the transition, air supply increases in the range of 30-60%. The supply of hydrogen to the engine upon transition initiation causes the equivalence ratio with respect to only the hydrogen fuel to be at least 0.1.

BRIEF DESCRIPTION OF THE DRAWINGS

The advantages described herein will be more fully understood by reading an example of an embodiment in which the invention is used to advantage, referred to herein as the Detailed Description, with reference to the drawings, wherein.

DETAILED DESCRIPTION

Figure 1:
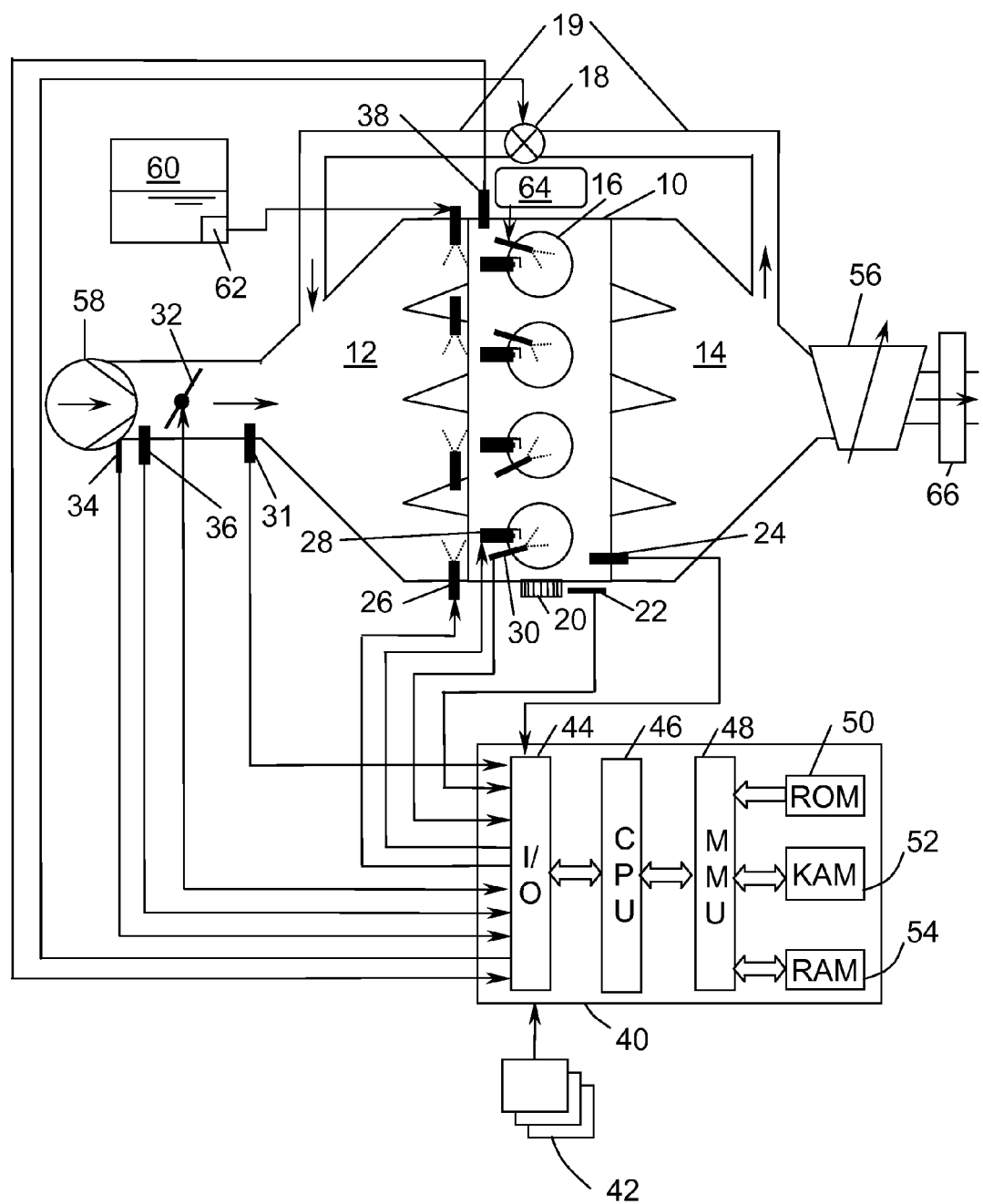
FIG. 1 is a schematic of an engine having two fuel supplies.

A 4-cylinder internal combustion engine 10 is shown, by way of example, in FIG. 1. Engine 10 is supplied air through intake manifold 12 and discharges spent gases through exhaust manifold 14. An intake duct upstream of the intake manifold 12 contains a throttle valve 32 which, when actuated, controls the amount of airflow to engine 10. Sensors 34 and 36 installed in intake manifold 12 measure air temperature and mass air flow (MAF), respectively. Sensor 31, located in intake manifold 14 downstream of throttle valve 32, is a manifold absolute pressure (MAP) sensor. A partially closed throttle valve 32 causes a pressure depression in intake manifold 12 compared to the pressure on the upstream side of throttle valve 32. When a pressure depression exists in intake manifold 12, exhaust gases are caused to flow through exhaust gas recirculation (EGR) duct 19, which connects exhaust manifold 14 to intake manifold 12. Within EGR duct 19 is EGR valve 18, which is actuated to control EGR flow. Hydrogen fuel is supplied to engine 10 by fuel injectors 30, injecting directly into cylinders 16, and port injectors 26 injecting a liquid fuel into intake manifold 12. This arrangement is shown by way of example and is not intended to be limiting. In other embodiments include having port injectors 26 supplying hydrogen fuel and direct injectors 30 supplying liquid fuel. Alternatively, both fuels are supplied through direct fuel injectors. In yet another embodiment both fuels are supplied by port injectors. The fuel other than hydrogen, in another embodiment, is a gaseous hydrocarbon fuel such as methane. Each cylinder 16 of engine 10 contains a spark plug 28. The crankshaft (not shown) of engine 10 is coupled to a toothed wheel 20. Sensor 22, placed proximately to toothed wheel 20, detects engine 10 rotation. Other methods for detecting crankshaft position may alternatively be employed.

In one embodiment, the engine is pressure charged by a compressor 58 in the engine intake. By increasing the density of air supplied to engine 10, more fuel can be supplied at the same equivalence ratio. By doing so, engine 10 develops more power. Compressor 58 can be a supercharger which is typically driven off the engine. Alternatively, compressor 58 is connected via a shaft with a turbine 56 disposed in the engine exhaust. Turbine 56, as shown in FIG. 1, is a variable geometry turbine; but, may be, in an alternative embodiment, a non-variable device. In another embodiment, the engine is naturally aspirated, in which embodiment elements 56 and 58 are omitted. Downstream of turbine 56 is three-way catalyst 66. Three-way catalyst 66 can alternatively be place upstream of turbine 56 for faster light-off. Alternatively, catalyst 66 is a lean NOx trap or lean NOx catalyst having the capability to reduce NOx at a lean equivalence ratio.

Two fuel tanks, 60 and 64, supply the two fuels. In the embodiment shown in FIG. 1, tank 60 contains liquid fuel and tank 64 contains hydrogen. However, as described above, the inventors of the present invention contemplate a variety of possible fuel combinations, with the appropriate fuel storage container included. In tank 60 fuel pump 62 pressurizes liquid fuel. Fuel tank 64 is under high pressure. Typically, no pressurization is required, but a pressure regulator may be used.

It is known in the prior art to make transitions between engine operating modes. For example, in stratified charge gasoline engines, transitions between lean, stratified to premixed, stoichiometric operation are known to pose a challenge because the equivalence ratio changes from lean to rich abruptly, with the fuel remaining constant. In the present invention, the equivalence ratio also changes abruptly when switching fuels because the best combination of hydrogen operating characteristics are achieved at an equivalence ratio less than 0.5; whereas, desirable fuel and emission operating characteristics are achieved with other fuels (hydrocarbons, alcohols, etc.) at an equivalence ratio of 1.0. Fuel transitions can be accomplished in a single cycle, whereas air lags thereby causing challenges during the transitions. The present invention differs from prior art transitions in stratified charge engines because in the present invention the fuel changes as well as the equivalence ratio.

It is known in the prior art to operate bi-fuel engines in which transitions are made between two fuels, such as between gasoline and propane or between gasoline and ethanol. However, most known fuels (gaseous hydrocarbons, liquid hydrocarbons, and alcohols) have a narrow range of flammability, equivalence ratio (roughly 0.65 lean limit and 1.7 rich limit) compared with hydrogen fuel (roughly 0.10 lean limit and 3 rich limit). Because most fuels cannot combust robustly at very lean equivalence ratios, their stable, lean operation occurs in a region in which high NOx is produced. Thus, most fuels, except hydrogen, are operated at stoichiometric, i.e., equivalence ratio of 1. Because very lean mixtures of hydrogen combust robustly, the amount of NOx produced is small allowing such lean operation without a great emission concern. Even though hydrogen can be combusted in a wide range of equivalence ratios, in an internal combustion engine, it is used in the 0.15 to 0.5 equivalence ratio range because when operating richer than 0.5 equivalence ratio harsh combustion and autoignition of the hydrogen results, conditions which are to be avoided. Thus, a bi-fuel engine, in which one of the two fuels is hydrogen, when making a transition from hydrogen to gasoline, a switch from an equivalence ratio of about 0.5, or leaner, to 1.0 occurs.

In summary, the present invention distinguishes between the prior art transitions between stratified, lean operation and stoichiometric operation, as discussed above, in that both a transition in equivalence ratio and fuel type occurs. The present invention distinguishes between the prior art bi-fuel transition because when one of the fuels is hydrogen, according to the present invention, switching among combustion modes results in an increase in both fuel type and equivalence ratio; whereas, in the prior art in which neither of the two fuels is hydrogen, the equivalence ratio does not substantially change when the fuel type changes.

Gaseous fuels that are delivered by an electronic fuel injector can be turned on, off, or anywhere in between in a single cycle with the only transient issue being inventory of fuel in the intake manifold in the case of the fuel injector being located in the intake port. Liquid fuels that are supplied directly to the combustion chamber (direct injected) can be affected in a single cycle. However, liquid fuels that are supplied into the intake port (port injected) present some difficulties due to fuel films that form on port surfaces. That is, when activating injectors, some of the fuel sprayed wets manifold walls and does not enter the combustion chamber directly. When deactivating liquid, port injectors, the fuel films on the walls remaining on intake port walls are removed and are inducted into the combustion chamber; this fuel inventory takes several intake events to empty. For example, changing the amount of air being inducted into a cylinder abruptly presents an issue as it takes several engine cycles for a manifold to fill or empty. Thus, the transition from one fuel to the other takes at least several engine cycles. In one embodiment, a switch between fuels is accomplished over tens of cycles.

In one embodiment, both fuels are delivered during the transition period while the supplied air is adjusted to the new operating condition. It is known to those skilled in the art that hydrogen, when used to supplement gasoline (or other hydrocarbon fuel) facilitates combustion at a substantially leaner equivalence ratio than would be possible with gasoline alone.

Figure 2A:
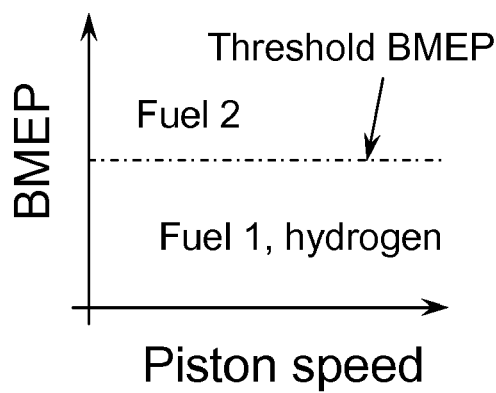
FIGS. 2a-b show engine operating maps of BMEP and piston speed, showing operating zones for two fuels.
Figure 2B:
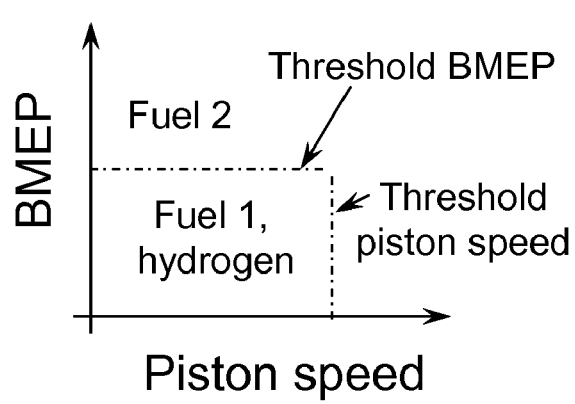

In FIG. 2a, it is shown the fuel 2 is used when the threshold BMEP is exceeded. This threshold is associated with an equivalence ratio of the hydrogen which is greater than a desirable level, e.g., 0.5. That is, to produce more than the threshold BMEP, the hydrogen equivalence ratio would exceed 0.5. In FIG. 2b, an additional constraint is placed on hydrogen operation in that when the piston speed exceeds a certain threshold, the engine transitions to fuel 2.

Figure 3:
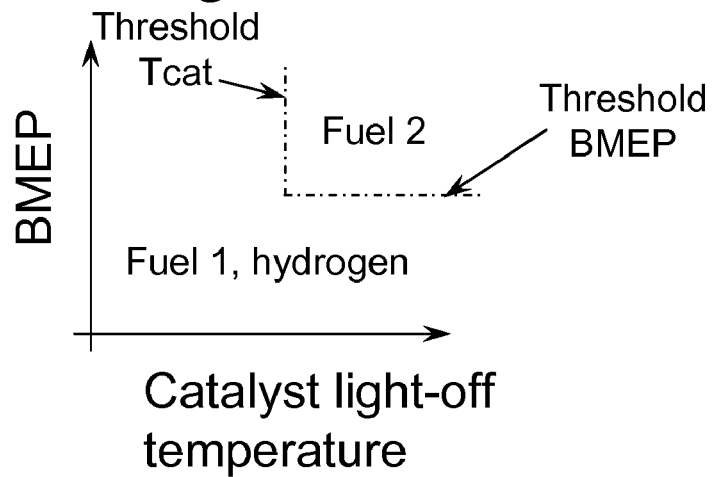
FIG. 3 shows an engine operating map of BMEP and catalyst temperature, showing operating zones for two fuels.

When cold, the engine starts on hydrogen fuel, which presents no cold start vaporization and mixing issues such as a liquid fuel. In FIG. 3, fuel 2 is only used when both the catalyst has attained its light-off temperature and the threshold BMEP has been exceeded.

Figure 4:
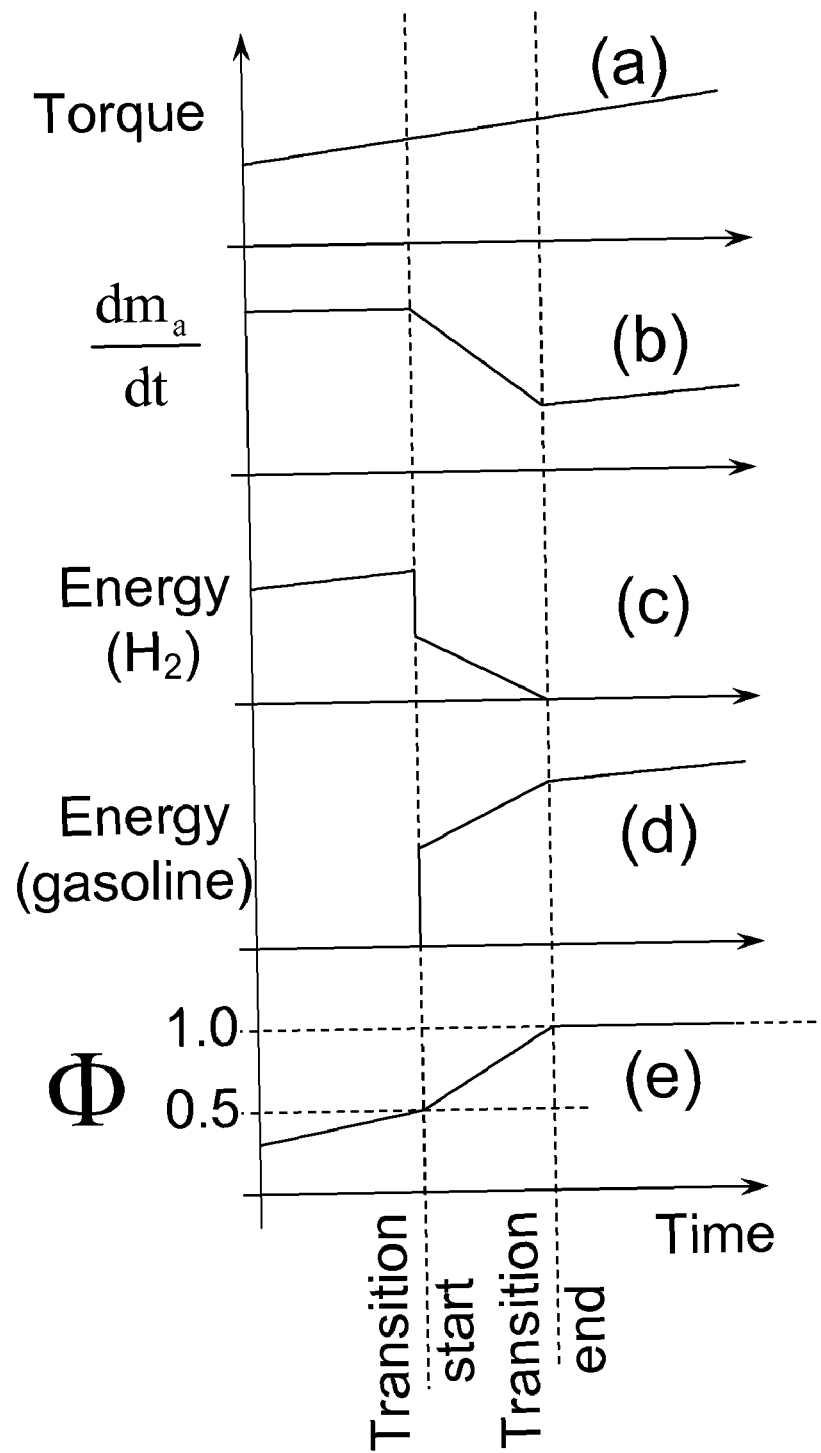
FIGS. 4 and 5 show timelines of transitions from hydrogen to gasoline.

In FIG. 4, one embodiment of a transition from hydrogen to gasoline is shown in a timeline. Before the transition, hydrogen is used; after the transition, gasoline is used; and during the transition, a combination of the two fuels is used. In the top graph, a, torque is increasing. In the bottom graph, e, the equivalence ratio, $\Phi$, is less than 0.5 prior to the transition. As discussed above, a transition from hydrogen to gasoline is desirable when the hydrogen equivalence ratio approaches 0.5; thus, the transition is initiated. In graph c, the amount of hydrogen provided increases prior to the transition to provide the increased torque of graph a. Prior to the transition, the air delivery rate, $dm_a/dt$ of graph b, remains constant with the additional torque provided by increasing hydrogen. At transition initiation, the throttle is partially closed and the amount of air is decreased. Air supply decreases such that the air supplied by the end of the transition is that required to provide $\Phi=1.0$, which is the desired equivalence ratio for all fuels, except hydrogen. One of the reasons that there is a transition period is that air delivery cannot be changed in one engine cycle. Instead, even when the throttle is opened rapidly, it takes several engine cycles for the manifold to fill and the desired amount of air to be provided to the engine. Because the air is more than desired right after the start of the transition, hydrogen supply is continued. It is known by those skilled in the art, that by supplementing a conventional fuel with hydrogen, that the conventional fuel can robustly combust at an equivalence ratio at which it is unable to do so without the presence of hydrogen. Thus, the hydrogen continues through the transition period, until the equivalence ratio achieves the desired 1.0, at which time the hydrogen supply is discontinued. Alternatively, but not shown in the Figure, the hydrogen supply could be discontinued when the equivalence ratio reaches a ratio that the conventional fuel, e.g., gasoline, can robustly combust, such as greater than 0.8. Gasoline supply is initiated at the start of the transition. However, as discussed above, because the air cannot be reduced as quickly as desired, the hydrogen is continued into the transition period to ensure the combustion. Through the transition period, the gasoline is increased and the hydrogen decreased, as well as the air decreasing, so that by the end of the transition period, the gasoline operation takes over with no hydrogen assistance.

Figure 5:
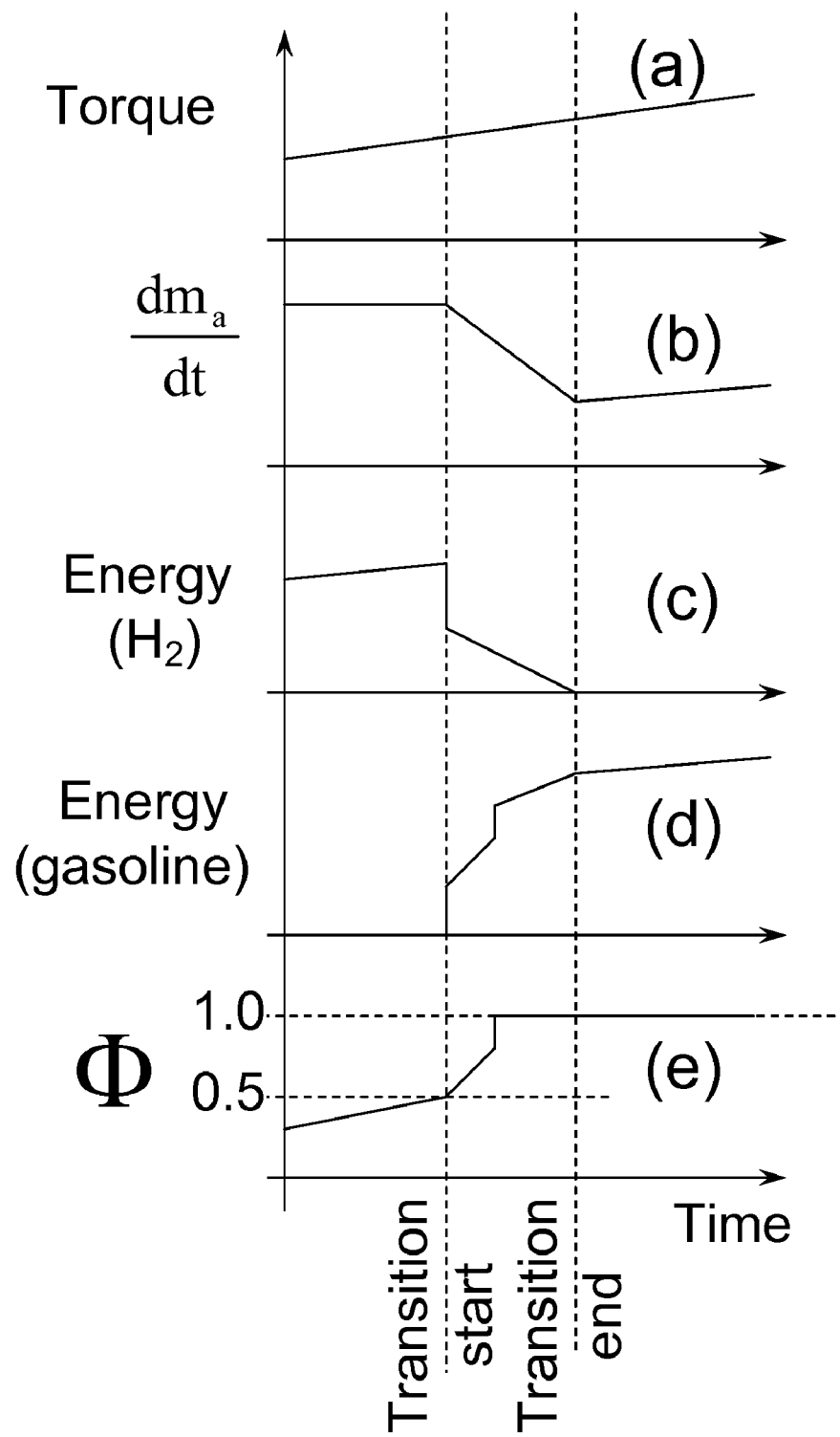

In FIG. 5, an alternative embodiment is shown in which the initial portion of the transition is similar to that shown in FIG. 4. However, at a point during the transition, the equivalence ratio is bumped up to 1.0 and maintained at 1.0 for the remainder of the transition. This is done to avoid the high NOx region of 0.85-0.90 phi. However, during this transition period of 1.0 equivalence ratio, the hydrogen supply is continuously being decreased and the gasoline supply is increased. At the end of the transition, hydrogen supply has ceased.

In the above discussion, a hydrogen-to-gasoline transition is described. However, the reference to gasoline is provided by way of example and is not intended to be limiting. Furthermore, the transition occurring at $\Phi=0.5$ is also by way of example. The actual transition may occur at slightly lower or higher equivalence ratios than exactly 0.5.

A transition from a higher torque to a lower torque in which gasoline (or other fuel) operation is transitioned to hydrogen operation can be accomplished in the reverse of what is shown in FIGS. 4 and 5. If the fuel other than hydrogen is a liquid fuel and is port injected, the inventory of the fuel in the intake manifold is accounted for to provide the desired fuel into the combustion chamber.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

What is claimed:

1. A method to control an internal combustion engine, comprising:
    operating the engine using only hydrogen fuel and increasing hydrogen fuel supplied to the engine to increase engine power when the equivalence ratio is below a first equivalence ratio threshold;
    decreasing the amount of air supplied to the engine and abruptly decreasing supply of hydrogen fuel to the engine while initiating supply of a liquid fuel to the engine when the equivalence ratio exceeds the first threshold; and
    reducing hydrogen fuel while increasing the liquid fuel until the engine is operating on substantially only the liquid fuel.

2. The method of claim 1 wherein the first equivalence ratio threshold is an equivalence ratio above which one of harsh combustion and autoignition of hydrogen fuel occurs.

3. The method of claim 1 wherein the first equivalence ratio threshold is about 0.5.

4. The method of claim 1, further comprising:
    increasing supply of the liquid fuel abruptly so that equivalence ratio is abruptly increased from a second equivalence ratio threshold to a stoichiometric equivalence ratio to minimize operation within a predetermined range of equivalence ratios.

5. The method of claim 4 wherein the second equivalence ratio threshold is a high NOx production equivalence ratio.

6. The method of claim 1 wherein decreasing the amount of air, decreasing abruptly the supply of hydrogen fuel, and initiating supply of a liquid fuel are coordinated to provide a smooth increase in torque.

7. A method to transition from a first operating mode in which only hydrogen fuel is supplied to the engine and a second operating mode in which substantially only a hydrocarbon fuel is supplied to the engine, comprising:
    conducting the transition when equivalence ratio during the first operating mode leads to autoignition conditions, the transition conducted in a transition initiation phase followed by a transition completion phase;
    the transition initiation phase comprising:
    decreasing air supply to the engine;
    decreasing an amount of hydrogen supplied to the engine; and
    initiating supply of the hydrocarbon fuel to the engine; and
    the transition completion phase comprising:
    increasing abruptly delivery of the hydrocarbon fuel to the engine; and
    decreasing supply of hydrogen continually through the transition completion phase wherein equivalence ratio during the transition initiation phase is maintained at less than a first threshold equivalence ratio and equivalence ratio during the transition completion phase is maintained at substantially 1.0.

8. A method to transition from a first operating mode in which only hydrogen fuel is supplied to the engine and a second operating mode in which substantially only a hydrocarbon fuel is supplied to the engine, comprising:
    conducting the transition in a transition initiation phase followed by a transition completion phase;

the transition initiation phase comprising:
decreasing air supply to the engine;
decreasing an amount of hydrogen supplied to the engine; and
initiating supply of the hydrocarbon fuel to the engine; and
the transition completion phase comprising:
increasing abruptly delivery of the hydrocarbon fuel to the engine; and
decreasing supply of hydrogen continually through the transition completion phase wherein equivalence ratio during the transition initiation phase is maintained at less than a first threshold equivalence ratio and equivalence ratio during the transition completion phase is maintained at substantially 1.0, wherein the transition is conducted when equivalence ratio during the first operating mode leads to engine harshness.

9. A method to transition from a first operating mode in which substantially only hydrogen fuel is supplied to the engine and a second operating mode in which substantially only a hydrocarbon fuel is supplied to the engine, comprising:
conducting the transition in a transition initiation phase followed by a transition completion phase;
the transition initiation phase comprising:
decreasing air supply to the engine;
decreasing an amount of hydrogen supplied to the engine; and
initiating supply of the hydrocarbon fuel to the engine; and
the transition completion phase comprising:
increasing abruptly delivery of the hydrocarbon fuel to the engine; and
decreasing supply of hydrogen continually through the transition completion phase wherein equivalence ratio during the transition initiation phase is maintained at less than a first threshold equivalence ratio and equivalence ratio during the transition completion phase is maintained at substantially 1.0, wherein the transition is conducted when equivalence ratio during the first operating mode exceeds about 0.5.

10. The method of claim 7 wherein the first threshold equivalence ratio is about 0.85.

11. The method of claim 7 wherein the transition completion phase is conducted in response to equivalence ratio in the engine exceeding the first threshold equivalence ratio.

12. The method of claim 11 wherein the abrupt increasing of the hydrocarbon fuel is sufficient to cause the equivalence ratio to abruptly increase from the first equivalence ratio to 1.0 thereby avoiding an equivalence ratio range in which high NOx is produced.

13. A method for controlling an internal combustion engine, comprising:
supplying only hydrogen fuel to the engine in an amount to avoid a high NOx producing equivalence ratio range within the engine during transitions between the hydrogen fuel and a hydrocarbon fuel.

14. The method of claim 13 wherein the high NOx producing equivalence ratio range is 0.85 to 0.9.

15. The method of claim 13 wherein the high NOx producing equivalence ratio range is avoided by abruptly increasing the amount of hydrocarbon fuel supplied to the engine when the transition is from the hydrogen fuel to hydrocarbon fuel.

16. The method of claim 15 wherein the abrupt increase causes the equivalence ratio to abruptly change from a lower equivalence ratio less than the high NOx producing equivalence ratio range to an upper equivalence ratio greater than the high NOx producing equivalence ratio range.

17. The method of claim 13 wherein the high NOx producing equivalence ratio range is avoided by abruptly decreasing the amount of hydrocarbon fuel supplied to the engine when the transition is from hydrocarbon fuel to hydrogen fuel.

18. The method of claim 17 wherein the abrupt decrease causes the equivalence ratio to abruptly change from an upper equivalence ratio greater than the high NOx producing equivalence ratio range to a lower equivalence ratio less than high NOx producing equivalence ratio range.

19. A method for controlling a bi-fuel engine comprising:
operating in a first mode powered by only hydrogen fuel;
operating in a second mode powered by substantially only a liquid fuel; and
rapidly decreasing the hydrogen fuel and rapidly increasing the liquid fuel to transition between the first and second modes while substantially avoiding operation within a predetermined range of equivalence ratios between a predetermined threshold and unity.

20. The method of claim 19 wherein the predetermined range of equivalence ratios is associated with high NOx generation.

21. The method of claim 19 wherein the predetermined range of equivalence ratios includes equivalence ratios between about 0.85 and about 0.90.

* * * * *